(12) United States Patent
Ohwe et al.

(10) Patent No.: US 6,781,794 B2
(45) Date of Patent: Aug. 24, 2004

(54) HEAD SUSPENSION HAVING DIFFERENT HARDNESS CONTACT SURFACES FOR HEAD SLIDER CONTROL DURING SHOCK

(75) Inventors: Takeshi Ohwe, Kawasaki (JP); Akio Gouo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/443,306

(22) Filed: May 22, 2003

(65) Prior Publication Data

US 2003/0193751 A1 Oct. 16, 2003

Related U.S. Application Data

(62) Division of application No. 09/546,970, filed on Apr. 11, 2000, now Pat. No. 6,594,116.

(30) Foreign Application Priority Data

Jul. 23, 1999 (JP) .............................. 11-209960

(51) Int. Cl.⁷ ................................................ G11B 5/48
(52) U.S. Cl. .................................................... 360/245.1
(58) Field of Search ....................................... 360/245.1

(56) References Cited

U.S. PATENT DOCUMENTS

| 5,079,660 A | 1/1992 | Yumura et al. |
| 5,166,847 A | 11/1992 | Zak |
| 6,549,376 B1 * | 4/2003 | Scura et al. ............. 360/245.1 |

FOREIGN PATENT DOCUMENTS

| JP | 62028973 | 2/1987 | |
| JP | 03076071 | 4/1991 | |
| JP | 05151538 A * | 6/1993 | ............ G11B/5/49 |
| JP | 07014333 | 1/1995 | |
| JP | 11185416 | 7/1999 | |

* cited by examiner

Primary Examiner—Craig A. Renner
(74) Attorney, Agent, or Firm—Greer, Burns & Crain, Ltd.

(57) ABSTRACT

In the present invention, an intermediate member having a hardness different than that of a pivot is provided. According to this structure, the pivot is in contact with the intermediate member, and rubs the intermediate member to control the sliding of the pivot. Since the intermediate member has a different hardness than the pivot, these elements can better bear the acceleration of a head suspension in high speed operation. Moreover, generation of dust can be controlled and reliability can also be improved.

3 Claims, 5 Drawing Sheets

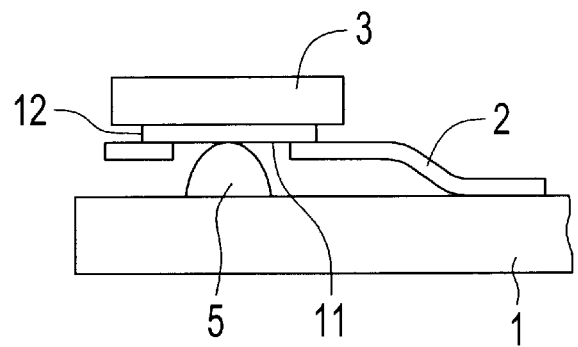
Fig. 7
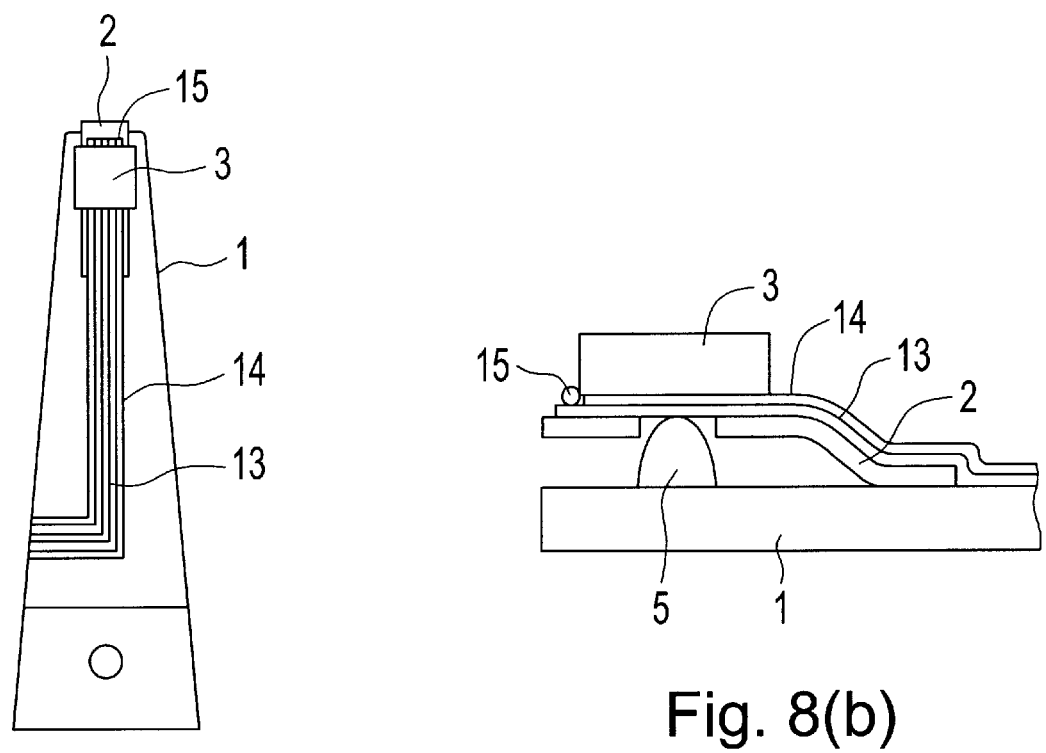
Fig. 8(a)
Fig. 8(b)

HEAD SUSPENSION HAVING DIFFERENT HARDNESS CONTACT SURFACES FOR HEAD SLIDER CONTROL DURING SHOCK

This is a divisional, of application Ser. No. 09/546,970, filed Apr. 11, 2000, now U.S. Pat. No. 6,594,116, issued Jul. 15, 2003.

The present invention relates to a head suspension to support a head slider in a disk drive apparatus, and more particularly, to a head suspension which is more stable during high speed acceleration and generates less dust.

BACKGROUND OF THE INVENTION

FIG. 1 illustrates a structure of a head suspension of the related art. A load beam (spring arm) 1 made of stainless steel is spot-welded to a spacer 4 and the load beam 1 is fixed by a caulking method to an arm (not illustrated). Both sides of the load beam 1 are bent to form a rigid rib 1a. At the end portion of the load beam 1, a gimbal 2 made of stainless steel is spot-welded.

The end portion of gimbal 2 is bent toward the disk 14 to form a tongue portion 2a. The tongue portion 2a generates a spring force in the direction perpendicular to the surface of a disk 14.

At the surface of tongue portion 2a opposing the disk 14, a head slider 3 is mounted. The head slider 3 is generally fixed to the tongue portion 2a by a bonding method. A part of the surface opposed to the tongue portion 2a of the gimbal 2 is projected toward the tongue portion 2a to form a pivot 5.

The pivot can be formed by punching the gimbal 2 with a punch. The end portion of the pivot 5 is in contact with the inside surface opposite the surface to which the head slider 3 is mounted. When the disk 14 rotates, the slider 3 receives the air flow generated between the slider 3 and the disk 14. As a result, the slider 3 floats from the surface of disk 14, keeping a small gap, and rotates in every direction with the end point of pivot 5 used as a fulcrum.

The head suspension moves, on the occasion of reading or writing information from or to the disk, on the surface of the disk at a high speed so that the head slider can access the predetermined position on the disk. In recent years, with higher speed access, some disk apparatus drive the head suspension with an acceleration of 200G or more.

In the head suspension of the related art, improvement in the access rate allows the tongue portion of the gimbal to slide, resulting in a drop of resonance frequency, which is the important characteristic of the head suspension, and a drop of positioning accuracy of the head. Moreover, friction between the pivot and tongue portion has resulted in the phenomenon that both elements generate dust within the disk enclosure as they wear out. If dust is adhered to the disk medium, it will cause a head crash or the like and thereby reliability of the disk apparatus is deteriorated.

As explained above, in the head suspension of the related art, there is a need for further improved high speed operation for disk apparatus, and higher reliability.

OBJECTS OF THE INVENTION

It is therefore a first object of the present invention to provide a new head suspension capable of high speed access.

A second object of the present invention is to provide a new highly reliable disk apparatus.

A third object of the present invention is to provide a new head suspension to prevent dust generated between a pivot and pivot contact surface.

A fourth object of the present invention is to provide a new head suspension which reduces sliding between the pivot and pivot contact surface.

SUMMARY OF THE INVENTION

In the present invention, an intermediate member having a hardness different from that of a pivot is provided on at least one of the pivot and the surface opposed to the pivot. According to this structure, the pivot is in contact with the intermediate member. Since the intermediate member is not as hard as the pivot, the pivot rubs the intermediate member to control the sliding of the pivot. Therefore, these elements can bear the acceleration of a head suspension in high speed operation. Moreover, generation of dust can be better controlled and reliability can also be improved.

Intermediate members may be provided on both the pivot and the surface opposed to the pivot. However, one intermediate member has hardness higher than that of the pivot and the other member has hardness smaller than that of the pivot. According to this structure, the intermediate members are in contact with each other. Since there is a large difference of hardness between these members, their friction coefficient becomes large. Therefore, the pivot can bear a larger acceleration.

Moreover, in the present invention, a recess can be formed at the contact surface between the gimbal or load beam and the pivot. According to this structure, a part of the pivot enters the recess thereby movement of the pivot is restricted within the range surrounded by the recess. Therefore, sliding of the pivot is restricted to enable high speed movement of the head suspension. Here, it is also possible that the intermediate member consisting of the material having the hardness which is smaller than that of the pivot is arranged at the surface to be in contact with the pivot. According to this structure, not only the moving range of the pivot is limited but also wear of the pivot is further alleviated. Particularly, when the intermediate member is the layer covering the signal line for transmitting the signal to the head, the existing element may also be used as the intermediate member, which is preferable from the viewpoint of cost.

Moreover, in the present invention, projections may be formed along the longitudinal direction at the contact surface with the pivot of the gimbal or load beam.

A surface of each projection is formed vertical to the moving direction of the load beam. According to this structure, movement of the pivot toward the radial direction of the disk may be restricted because the projections work as walls. Therefore, sliding of the pivot in the radial direction of the disk is restricted, to assure high speed movement of the head suspension.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 7 is a diagram illustrating the head suspension of the fifth embodiment of the present invention;

FIG. 8(a) is a plan view of the head suspension of the sixth embodiment of the present invention;

FIG. 8(b) is a cross-section elevational view of the head suspension of FIG. 8(a);

DETAILED DESCRIPTION

Figure 1A:
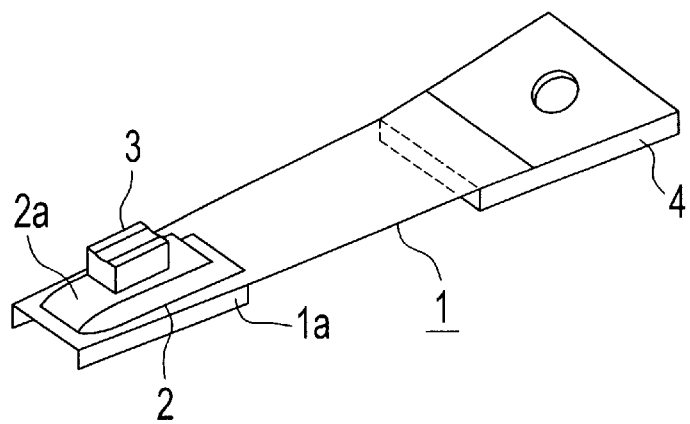
FIG. 1(a) is a perspective view of the head suspension of the related art.
Figure 1B:
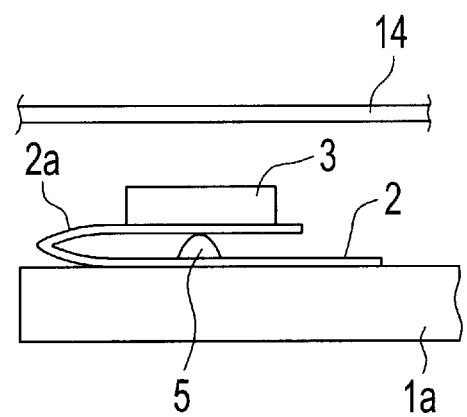
FIG. 1(b) is a side view of the head suspension of the related art.
Figure 2:
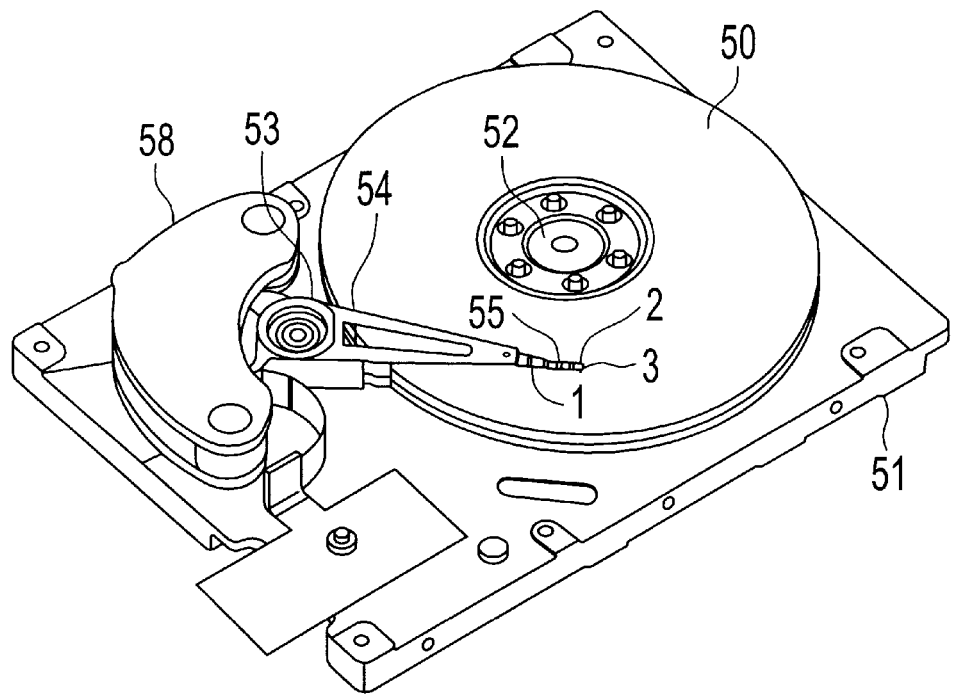
FIG. 2 is a diagram illustrating the magnetic disk apparatus of the present invention.

FIG. 2 illustrates a disk apparatus in which the head suspension of the present invention is used and is a plan view of the disk apparatus with the cover removed.

A spindle motor 52 is mounted on a base plate 51 to rotate the disk 50. An actuator 53 which rotates in the disk radial direction is also mounted on the base plate 51.

At one end of the actuator 53, a plurality of head arms 54 extending in parallel to the recording surface of the disk 50 are formed. At one end of the head arm 54, a head suspension 55 is mounted for each recording surface of the disk 50. The head suspension 55 is composed of the load beam 1 of which longitudinal direction is extended along the rotating direction of disk 50 and the gimbal supporting the head slider 3. The base end side of the load beam 1 is mounted to the head arm 54 and the gimbal 2 is provided in the end portion. At the surface of the gimbal opposing the corresponding recording surface, the head slider 3 is mounted via an insulating film (not illustrated). At the other end of the actuator 53, a coil (not illustrated) is mounted.

On the base plate 51, a magnetic circuit 58 composed of a permanent magnet and a yoke is provided. Within the magnetic gap of the magnetic circuit 58, the above coil is arranged. A voice coil motor (VCM) is formed of the magnetic circuit 58 and coil. Moreover, the upper part of the base plate 51 is covered with the cover (not illustrated).

The operation of the disk apparatus explained above will now be explained.

When the disk 50 is not rotated, the slider 3 is also stopped in contact with a saving (or parking) zone of the magnetic disk 50. Next, when the magnetic disk 50 is rotated with the spindle motor 52, the slider 3 is caused to float from the disk surface, keeping a little gap with the air flow generated by rotation of the magnetic disk 50. When a current flows under the condition that the slider is floating, a propulsive force is generated in the coil and the actuator 53 rotates. The slider 3 moves on the predetermined track of the magnetic disk 50 to read or write data.

Next, various profiles of the head suspension of the present invention will be explained.

Figure 3:
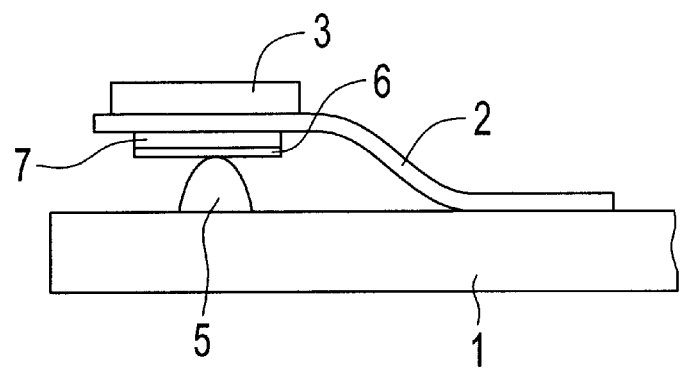
FIG. 3 is a diagram illustrating a head suspension of the first embodiment of the present invention.

FIG. 3 is a cross-sectional view along the longitudinal direction of the head suspension of the first embodiment.

At the end portion of the load beam 1, a pivot 5 is formed. The pivot 5 can be formed by punching the load beam 1 with a punch. The gimbal 2 and load beam 1 are preferably formed of stainless steel. Therefore, the pivot 5 is also formed of stainless steel. The thickness of the load beam 1 may be in the range of about 0.02 mm to 0.08 mm, and height of the pivot 5 may be in the range of about 0.02 mm to 0.1 mm from the surface of the load beam 1.

The gimbal 2 is mounted by spot-welding it to the area in the base end portion side of the load beam 1 adjacent the pivot 5. Like the load beam 1, the gimbal 2 is also preferably formed of stainless steel. The head slider 3 is provided on the surface of the gimbal opposed to the disk.

At the surface of the gimbal 2 opposing the load beam 1, an intermediate member 7 is formed. The preferable thickness of intermediate member 7 is about 0.1 mm or less. As the material forming the intermediate member 7, for example, a resin such as polyimide and a metal such as Au are used. These materials have higher viscosity and also less hardness than the pivot 5. When the intermediate member 7 is formed of polyimide, a method can be used, in which film type polyimide is adhered to the gimbal 2, or the gimbal 2 is dipped or coated with the liquid polyimide. Moreover, when the intermediate member 7 is formed of a metal material, a method such as sputtering and evaporation can be used.

According to this embodiment, the pivot 5 is not in direct contact with the gimbal 2. The pivot 5 pushes the intermediate member 7 having a hardness different than that of the pivot 5. When the intermediate member 7 is softer than the pivot 5, the intermediate member 7 is recessed. Particularly, using the polyimide-based resin and Au having a higher viscosity, a friction coefficient between the pivot 5 and intermediate member 7 becomes large. Therefore, sliding between the pivot 5 and gimbal 2 is controlled and the generation of dust can be prevented. Moreover, the positioning accuracy of the head slider 4 can be improved by the damping effect.

Figure 4:
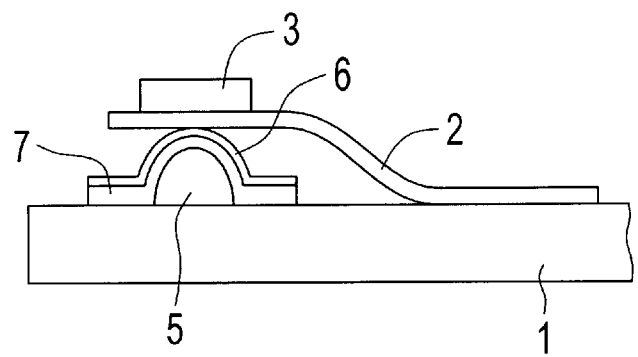
FIG. 4 is a diagram illustrating the head suspension of the second embodiment of the present invention.

FIG. 4 is a cross-sectional view along the longitudinal direction of the head suspension in the second embodiment.

In this embodiment, the intermediate member 7 is formed in the side of the load beam 1 to cover the pivot 5. As the material of the intermediate member 7, material the same as that of the intermediate member 7 in the first embodiment explained previously may be used. The surface of pivot 5 is semi-spherical but like the first embodiment, the intermediate member 7 can easily be formed spherically by coating or dipping or attachment when a resin material is used, or by evaporation or sputtering when a metal material is used.

According to the present embodiment, the gimbal 2 does not come in direct contact with the pivot 5. The gimbal 2 is closely in contact with the intermediate member 7 having hardness smaller than that of the gimbal 2, and the gimbal 2 is in contact with the intermediate member 7. Therefore, the friction coefficient becomes large, which controls sliding of the pivot 5 and prevents generation of dust.

Figure 5:
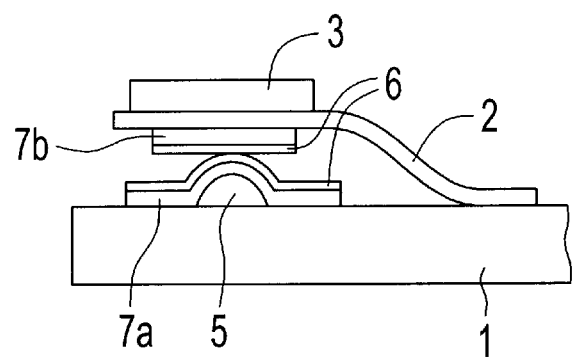
FIG. 5 is a diagram illustrating the head suspension of the third embodiment of the present invention.

FIG. 5 is a cross-sectional view along the longitudinal direction of the head suspension in the third embodiment of the present invention.

In this embodiment, an intermediate member 7a is formed on the side of the load beam 1, while an intermediate member 7b on the side of the gimbal 2. Here, the intermediate members 7a, 7b are respectively formed of different materials. Moreover, the intermediate member 7a has hardness that is preferably larger than that of the pivot 5, while the intermediate member 7b has hardness smaller than that of the pivot 5. However, the intermediate member 7a can also have a hardness that is smaller than the pivot 5, and in this case, the immediate member 7b preferably has a hardness that is softer than the pivot. In more practical terms, as the intermediate member 7a, a metal such as Ti, W, TiW, an oxide such as $Al_2O_3$, TiO and a nitride such as TiN are selected. On the other hand, as the intermediate member 7b, a resin such as polyimide or a metal such as Au may be selected.

According to this embodiment, the difference of hardness between the intermediate member 7a in the side of pivot 5 and the intermediate member 7b in the side of gimbal 2 becomes large. Therefore, a friction coefficient between the intermediate members 7a, 7b becomes large to control sliding of the pivot 5. Moreover, since a material having higher viscosity like polyimide and Au is used as the intermediate member 7b, the positioning accuracy of the head slider 3 can be improved by means of the damping effect.

In this embodiment, the intermediate member 7a in the side of the pivot 5 has hardness higher than that of the intermediate member 7b in the side of gimbal 2 but the present invention is not limited thereto. Namely, the intermediate member 7b may have higher hardness than that of the intermediate member 7a.

In the above first to third embodiments, sufficient close contact cannot be attained in some cases with the pivot 5 or gimbal 2, depending on the material of intermediate member 7. Therefore, in view of improving the close contact property, a close contact layer 6 may be formed between the intermediate member 7 and gimbal 2 or between the intermediate member 7 and pivot 5. For the close contact layer 6, an adequate material may be selected depending on the intermediate member 7. For example, when Au is used for the intermediate member 7, Cr or Ni is selected.

Moreover, in the first to third embodiments explained above, if sliding of the pivot cannot be prevented even when the intermediate member 7 is provided, a rough surface may be formed on the pivot 5 or intermediate member 7 through the process using plasma, $CF_4$, acid or alkali or the like. When the surface becomes rough, friction resistance between contact surfaces becomes large and thereby sliding of the pivot 5 call be prevented.

As explained above, in the first to third embodiments, it is very important to make the friction resistance between the contact surfaces in the sides of the load beam 1 and gimbal 2 large in order to prevent sliding of the pivot 5. An adequate friction coefficient $\mu$ is expressed by $\mu$=(mass of movable portion)×(acceleration)/load. Here, the mass of the movable portion is an equalized mass of the head slider 4 and gimbal 2 in terms of pivot 5, and acceleration is the acceleration of the movable portion.

Figure 6:
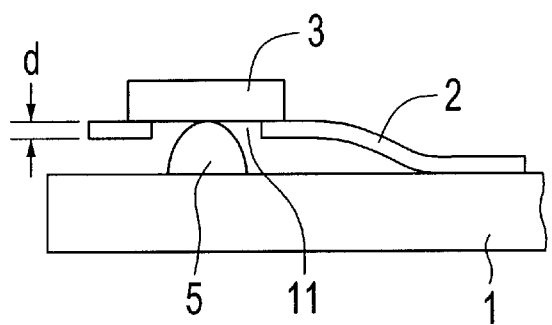
FIG. 6 is a diagram illustrating the head suspension of the fourth embodiment of the present invention.

FIG. 6 is a cross-sectional view along the longitudinal direction of the head suspension in a fourth embodiment of the present invention.

In this embodiment, a recess 11 is formed in the area of the gimbal 2 with which the pivot 5 is in contact. The diameter of the recess 11 is ranged from about 0.1 mm to 0.5 mm. The top area of the pivot 5 enters the recess 11 and is in contact with the surface in the opposite side of the surface opposing the disk medium of the head slider 3.

According to the fourth embodiment, since the pivot 5 can be moved only in the limited area of the recess, wear can be eased. Here, when the thickness of the gimbal 2 is defined as d, if the diameter of the recess 11 is smaller, no gap can be formed between the pivot 5 and the edge of the recess 11. Therefore, sliding of pivot 5 can be controlled and the pivot 5 is never worn out. In this head suspension, the head slider 3 is mounted on the gimbal 2 using a bonding agent, and the top area of pivot 5 is in contact with the bonding agent via the recess. As a result, sliding of the pivot 5 is controlled by the viscosity of the bonding agent. Moreover, the positioning accuracy of the head slider 3 can be improved by means of the damping effect.

In this embodiment, the recess 11 is through the hole provided through the gimbal 2, but it is also possible to form a recess (not shown) through the gimbal 2 in place of the through hole. Since the top area of the pivot 5 drops in the recess, a certain degree of slide prevention of the pivot 5 can be expected.

FIG. 7 is a cross-sectional view along the longitudinal direction of the head suspension in the fifth embodiment of the present invention.

In this embodiment, the intermediate member 12 is formed on the surface of the gimbal 2 where the head slider 3 is mounted, to which the recess 11 in the fifth embodiment is formed. The head slider 3 is mounted on the gimbal 2 via the intermediate member 12. The top area of the pivot 11 is in contact with the intermediate member 12. Material, size and forming method of the intermediate member 12 are the same as that of the intermediate member 7 in the first and second embodiments explained previously.

According to the fifth embodiment, since the pivot 5 can be moved only in the limited area of the recess, wear can be eased. Moreover, since the pivot 5 is in contact with the intermediate member 12 and has a hardness sufficiently smaller than that of stainless steel, wear of the pivot may be eased more than that of the fourth embodiment.

FIG. 8 are diagrams illustrating head suspension in the sixth embodiment of the present invention. FIG. 8(a) is a plan view of the head suspension and FIG. 8(b) is a side elevation of the peripheral portion of the gimbal.

A head element (not illustrated) for reading or writing data from or to the disk medium is mounted on the head slider 3. Moreover, signal lines 13 for transmitting the signals read from the disk and written to the disk by the head element are extended on the gimbal 2 and load beam 1, and are connected to the head slider 3 by solder balls 15. The signal lines 13 are covered with an insulating thin film 14 to assure electrical insulation. As the insulating thin film 14, polyamide is usually used.

In this embodiment, the polyamide film 14 for insulating the signal lines 13 is arranged between the head slider 3 and gimbal 2 and the polyamide film 14 is used as the intermediate member 12 in the fifth embodiment explained previously. The polyamide film 14 is formed on the gimbal 2 and load beam 1 by adhesion or pressure deposition. The thickness of the polyamide film 14 is ranged from about 0.005 mm to 0.05 mm.

According to this embodiment, since the pivot 5 can be moved only in the limited area of the recess, wear can be eased. Moreover, since the pivot 5 is in contact with the intermediate member 12 and has a hardness sufficiently smaller than that of stainless steel, wear of the pivot can be eased more than that in the fourth embodiment. Particularly, in this embodiment, the polyamide film 14 may be used as the intermediate member 12. The polyamide has a smooth surface and a small friction coefficient. Therefore, polyamide alleviates wear of tile pivot 5. Moreover, since the film already used can also be used as the intermediate member, it is no longer required to provide a new intermediate member 12, which it is preferable from the point of view of cost.

Even in the fourth to sixth embodiments, like the third embodiment, the intermediate member 12 may be formed on both the gimbal 2 and the pivot 5. Since the intermediate members 12 are provided opposed with each other, wear by sliding can further be alleviated and reliability may be improved.

Figure 9:
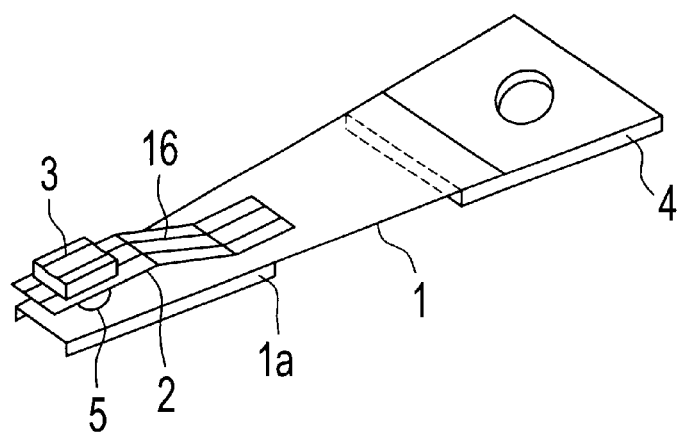
FIG. 9 is a diagram illustrating the head suspension of the seventh embodiment of the present invention.

FIG. 9 is a diagram illustrating a head suspension in the seventh embodiment of the present invention.

In this embodiment, a plurality of projections 16 are formed on the opposite surface from the surface of gimbal 2 where the head slider 3 is loaded. The projections are formed in the longitudinal direction of the load beam 1, namely in the direction along the rotating direction of the disk. The projections 16 can be formed by rolling the head slider loading surface of the gimbal 2 in the longitudinal direction of the load beam 1. Depending on the processing method, many projections 16 can be formed toward the same direction on the gimbal.

According to this embodiment, the top area of the pivot 5 is arranged in the area below and between the projections 16. Therefore, if acceleration is applied to the pivot 5 with movement of the load beam, the sliding distance is limited depending on the distance between the projections 16 and thereby wear may be eased. Particularly, when an interval or distance between the projections 16 is smaller than the diameter of pivot 5, the pivot 5 is in direct contact with the projections 16 and thereby sliding can be reduced. Accordingly, a large acceleration can be applied to the head suspension to enable high speed operation.

As explained in each embodiment, the present invention provides much to suppress sliding of the pivot and realize alleviation of wear by sliding, and also improves reliability of the disk apparatus and high speed operation.

In the head suspension in each embodiment explained above, the pivot 5 is formed in the side of the load beam 1, but it may be formed in the side of the gimbal 2. In such a structure, the pivot 5 is formed at the opposite surface of the surface where the head slider 3 is loaded and the intermediate member 7 and recess 11 are formed to the surface opposed to the gimbal 2 of the load beam 1. Even when the pivot 5 is formed in the side of the gimbal 2, sliding of the pivot can be prevented as in the case of the embodiments explained above.

Moreover, it is also possible to provide the pivot on an element other than the load beam 1 and gimbal 2.

Figure 10:
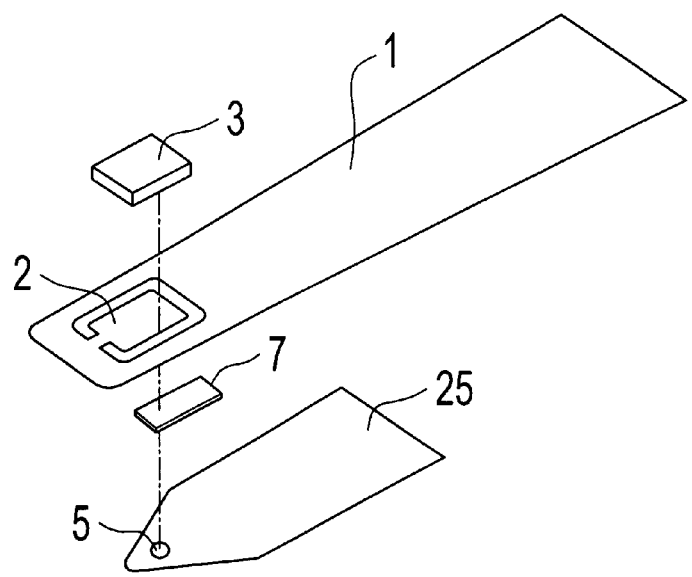
FIG. 10 is a diagram illustrating the head suspension of the eighth embodiment of the present invention.

FIG. 10 is an exploded perspective view of a head suspension in the eight embodiment of the present invention.

In this embodiment, the gimbal 2 and load beam 1 are integrally formed. The load beam 1 is composed of stainless steel. At the end portion of the load beam 1, a slit is formed and the area surrounded by the slit functions as the gimbal 2. At the corresponding surface opposed to the disk of gimbal 2, the head slider 3 is mounted. At the opposite surface (rear surface) of the head slider 2 loading surface of the gimbal 2, the intermediate member 7 is formed. Material, forming method, size or the like of the intermediate member 7 are similar to those in the first embodiment explained above. At the rear surface of load beam 1, a reinforcing plate 25 in which the pivot 5 is formed at its end portion is fixed, for example, by welding. Like the load beam 1, the reinforcing plate 25 is formed of stainless steel. The pivot 5 pushes against rear surface of the head slider loading surface of the gimbal 2 via the intermediate member 7.

In this embodiment, the intermediate member 7 is formed at the rear surface of gimbal 2, but it may also be formed on the pivot 5 as in the case of the second embodiment. Moreover, the intermediate member 7 may also be formed on both gimbal and pivot as in the case of the third embodiment. In addition, like the fourth embodiment, it is possible to use a structure where a recess is formed at the gimbal 2 and the top area of the pivot 5 enters the recess.

In addition, in the embodiments explained above, sliding of the pivot is prevented by the intermediate member, recess or projections, but sliding of the pivot can also be prevented by other methods, for example, by making the contact surface with the pivot rough by the inverse sputtering process or chemical process.

In head suspensions having the structures explained above, if the suspension is driven with a large acceleration, the pivot does not easily move and wear of the pivot and its contact surface can be eased. Therefore, generation of dust can be controlled, reliability of the disk apparatus can be improved, high speed acceleration can be enabled and high performance of the disk apparatus can also be realized.

While the principles of the invention have been described above in connection with specific apparatus and applications, it is to be understood that this description is made only by way of example and not as a limitation on the scope of the invention.

What is claimed is:

1. A head suspension comprising:

a load beam for giving a load to a head slider in a direction toward disk medium;

a gimbal mounted to said load beam, said head slider being mounted to said gimbal;

a pivot formed on said load beam for supporting said head slider thereon; and an intermediate member, having a hardness higher than said pivot, formed on a surface of said gimbal between said pivot and said gimbal.

2. The head suspension of claim 1, wherein said intermediate member has a first portion and a second portion, said first portion is formed on the surface of said gimbal, said second portion is formed on said pivot, and the hardness of said first portion is different than that of said second portion.

3. The head suspension of claim 1, further comprising a close contact member under said intermediate member.

* * * * *

UNITED STATES PATENT AND TRADEMARK OFFICE
CERTIFICATE OF CORRECTION

PATENT NO.    : 6,781,794 B2
DATED         : August 24, 2004
INVENTOR(S)   : Ohwe et al.

It is certified that error appears in the above-identified patent and that said Letters Patent is hereby corrected as shown below:

Column 8,
Line 39, between "in a direction toward" and "disk medium" insert -- a --.

Signed and Sealed this

Ninth Day of November, 2004

JON W. DUDAS
*Director of the United States Patent and Trademark Office*